April 5, 1966     J. E. GIAMMARINO ETAL     3,243,917
ELECTRICAL MOTOR OPERATED TOY VEHICLE
Filed Feb. 27, 1963                        2 Sheets-Sheet 1

INVENTORS
Joseph E. Giammarino and
BY Derek A. Brand

Kenneth H. Murray
ATTORNEY

April 5, 1966    J. E. GIAMMARINO ETAL    3,243,917
ELECTRICAL MOTOR OPERATED TOY VEHICLE
Filed Feb. 27, 1963    2 Sheets-Sheet 2
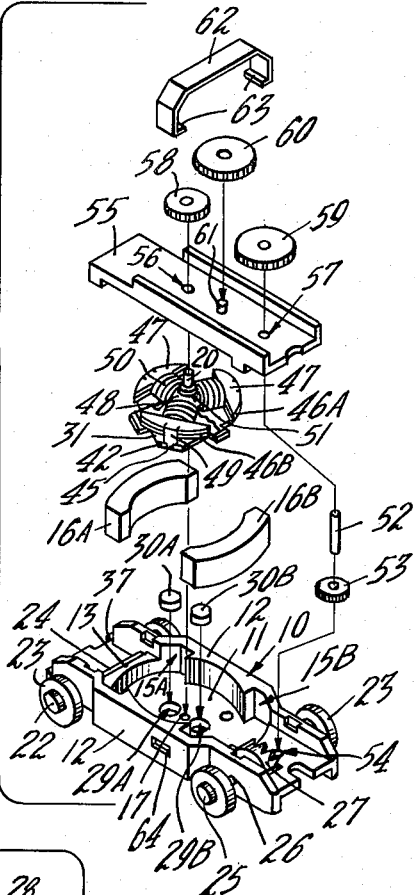
FIG. 5
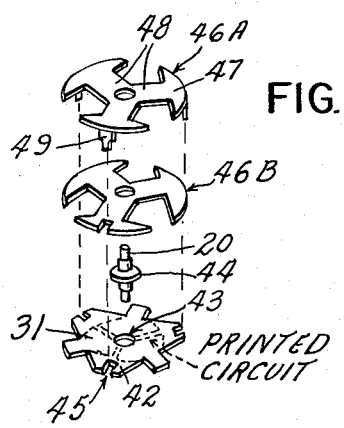
FIG. 7
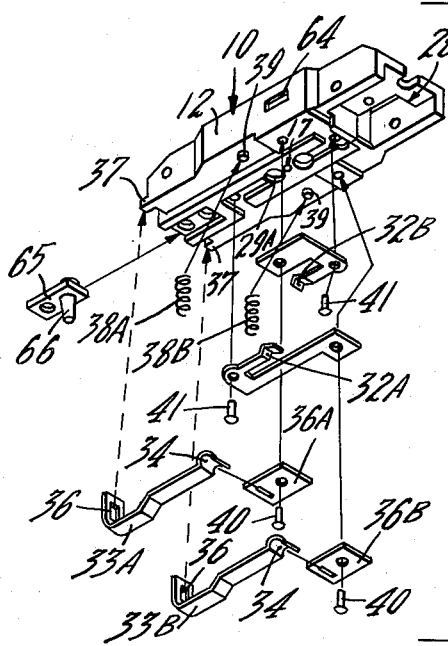
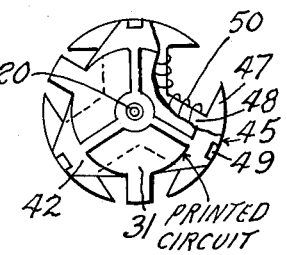
FIG. 8
FIG. 6
INVENTOR.
Joseph E. Giammarino and
BY    Derek A. Brand
Kenneth H. Murray
ATTORNEY

United States Patent Office 3,243,917
Patented Apr. 5, 1966

3,243,917
ELECTRICAL MOTOR OPERATED TOY VEHICLE
Joseph E. Giammarino, Rockville Centre, and Derek A. Brand, North Merrick, N.Y., assignors to Aurora Plastics Corp., West Hempstead, N.Y., a corporation of New York
Filed Feb. 27, 1963, Ser. No. 261,347
11 Claims. (Cl. 46—243)

This invention relates to electrical motors and is more particularly concerned with miniature electrical motors such as are used in the toy and model industries.

Electrical motors for toys and models generally operate on comparatively low voltages of between eight and twenty-four volts. In addition, the motors of this type used in toys and models must be very small since there are serious space and weight limitations. Further these motors must be made to withstand comparatively rough usage and handling and be easy to repair.

It is therefore, an object of this invention to provide a miniature electrical motor which is smaller and more compact than those now in use, without reducing the power output of such motor.

It is a further object of this invention to provide a miniature electrical motor which will operate on low voltage but which will produce more torque and power, and which will operate continuously without overheating.

It is a still further object of this invention to provide an electrical motor in which the motor is flat and compacted, to fit within a substantially flat compact area.

Further objects and advantages of the motor of this invention will be apparent from the description thereof.

For a better understanding of this invention, reference is made to the accompanying drawings, in which:

FIG. 5 is a top exploded view; and

FIG. 6 is a bottom exploded view of said motor;

FIG. 7 is an enlarged exploded perspective view of certain parts shown in FIGURE 5;

FIG. 8 is an enlarged plan view of the assembled parts shown in FIGURE 7.

For the purposes of illustration and explanation of the various novel features of the motor of the invention, an example is shown with a commutator type motor having a magnet stator. The electrical motor of this invention is especially intended to operate from a low voltage current as its source of power. Its compact construction and the light weight make it especially suitable for use in toy model automobiles, trucks, trains, and other types of vehicles operating on a track or roadway, for use in racing or otherwise, since more torque is generated with a minimum use of electrical power than in the motors currently being employed for these purposes. Since there is only a low current requirement, and the motor runs cooler than the conventional motor used for this purpose, it is safer in use for children.

Figure 1:
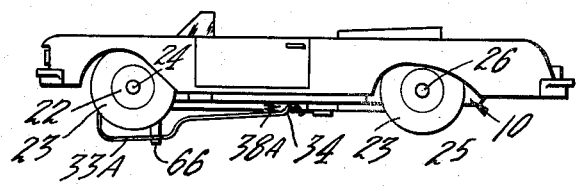
FIGURE 1 is a side elevational view of the motor of this invention.
Figure 2:
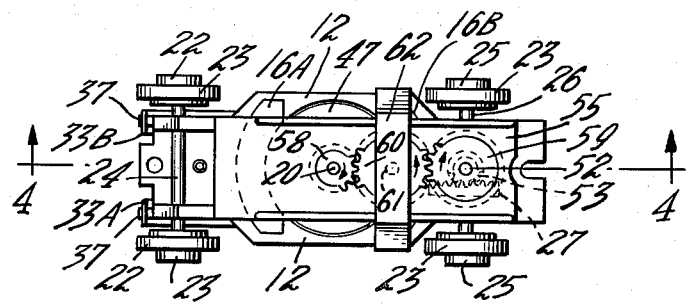
FIG. 2 is a top plan view.
Figure 3:
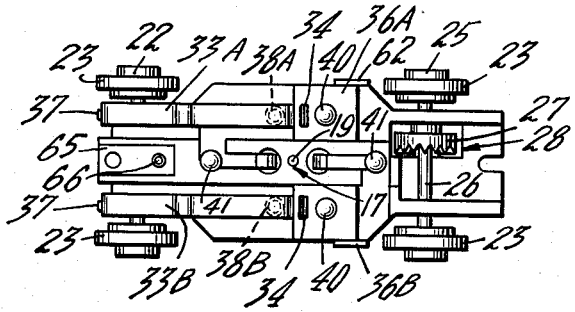
FIG. 3 is a bottom plan view.
Figure 4:
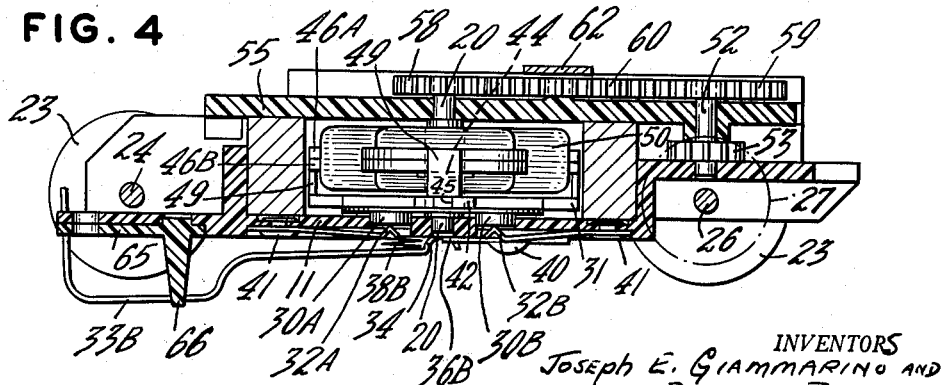
FIG. 4 is an enlarged section on the lines 4—4 of FIG 2.

Referring particularly to the drawings, one form of this type of motor will be described; 10 represents a combined motor housing and chassis of the vehicle which is of unitized construction. This housing is relatively flat as shown in FIG. 1 and spreads out the diameter of the motor and at the same time allows for the reduction in height of the motor. The housing is preferably of one piece and of a molded tough plastic such as nylon, so that the housing acts as an insulator as well as a chassis. The housing has a floor 11 and sides 12, both of which form the chassis of the toy vehicle and extend substantially the entire length of the vehicle. The sides 12 of the housing 10 are connected near the front end of the vehicle by a wall 13, which also is a portion of the housing and made integral therewith. The sides 12 are shaped as shown in FIG. 5, so that each of the inside surfaces forms a quarter circle. Portions of the floor 11 of the housing 10 adjacent the wall 13 and toward the rear of the housing are cut out as shown in FIG. 5, to provide spaces 15A and 15B, into which field magnets 16A and 16B may be fitted. The field magnets 16A and 16B, which are preferably in quarter circle sections, fit into the spaces 15A and 15B respectively, so that the inside surfaces of the field magnets and the inside surfaces of the side 12 of the housing form and enclose a central circular area of the floor of the housing.

In said central circular area of the floor of the housing, and preferably in the center thereof, a circular hole 17 extending through the floor provides for the insertion of the lower end 19 of the armature shaft 20, and holds the latter in position. The armature shaft 20, which is preferably of bronze, copper, brass or stainless steel, and which is adapted to revolve in the hole 17, has a circular lip 21, the lower portion of which bears upon the floor 11 of the housing. Since the housing is of hard plastic, the lip and the floor of the housing provide a bearing surface.

A pair of hubs 22, having miniature rubber or plastic tires 23 thereon, are mounted on the axle 24 which, in turn, is rotatably mounted in the front end of the housing to provide a pair of front wheels. A pair of hubs 25, also having rubber or plastic tires 23 thereon, are mounted on the axle 26, which is rotatably mounted in the rear portion of the housing, to form the rear wheels of the vehicle.

A crown gear 27, which is fixedly mounted on the axle 26, rotates vertically through an opening 28 provided in the rear floor of the housing.

A pair of openings 29A and 29B are provided in the floor of the housing 10, as shown in FIG. 5, in which a pair of commutator brushes 30A and 30B are movably fitted. These commutator brushes preferably have circular upper bearing surfaces adapted to bear against the commutator plate 31.

The front commutator brush 30A is held in position in the opening 29A and is caused to bear upwardly against the commutator plate 31, by the front brush spring 32A, as shown in FIG. 6. Similarly, the rear commutator brush 30B is supported in position in the opening 29B, and is caused to bear against the commutator plate 31, by the rear brush spring 32B.

In order to prevent wear of the lower surface of the commutator plate 31 and the brushes 30A and 30B, rollers may be substituted for the brushes, and these rollers would be held in position in the openings 29A and 29B and to bear against the commutator plate 31 by the brush springs 32A and 32B in the same manner as the brushes 30A and 30B are held in position. These rollers would rotate on the lower surface of the commutator plate 31, and thus eliminate a substantial amount of wear on the commutator plate as well as the rollers.

A pair of pick-up shoes 33A and 33B, which are preferably in the form of thin metal strips, as shown in FIG. 6, are provided to contact the track or electrical source to pick up the electrical current for operation of the motor. These pick-up shoes 33A and 33B are shaped to form a curved portion 34 at one end thereof, which portion is adapted to fit into slot 35 of pick-up holders 36A and 36B, so that when the pick-up holders are riveted to the housing 10, the curved portions 34 of the pick-up shoes 33A and 33B will be held firmly in position against the bottom of the housing. The other end 35 of the pick-up shoes 33A and 33B is folded at right angles as shown in FIG. 6, and has a vertical slot 36 in the folded area, which slot is adapted to slidably fit over bars 37 protruding from the front of the housing. By means of this construction, the end 35 of the pick-up shoes 33A and 33B can move vertically when in contact with the track or other current source, but will always maintain the same horizontal position.

The pick-up shoes 33A and 33B are held downwardly from the housing in order to bear continuously against the track or power source, by a pair of pick-up springs 38A and 38B, which are mounted on posts 39 extending from the bottom of the housing. The springs 38A and 38B bear against the pick-up shores 33A and 33B to push it downwardly from the housing, but at the same time provide cushioned pressure to take up any shock on the pick-up shoes.

In order to maintain contact between the pick-up shoes 33A and 33B, with the pick-up holders 36A and 36B, and the brush springs 38A and 38B, rivets 40 passing through holes provided in the pick-up holders 36A and 36B and fixed to the housing are provided, and these rivets hold the pick-up shoes, the pick-up holders and the plate of the brush springs firmly to the housing and in contact with each other. For further strength and better contact, the plates of the front brush spring 32A and the rear brush spring 32B have a second rivet 41 holding the plate to the bottom of the housing.

The front brush spring 32A is in contact with the under side of the commutator brush 30A and tends to push it upwardly to insure contact with the commutator plate. Similarly, the rear brush spring 32B pushes upwardly on the underside of the commutator brush 30B to maintain contact with the commutator plate.

When the assembly as above described has been mounted on the underside of the housing 10, the housing is turned over and is ready for further assembly on its upper side. The armature assembly which is mounted on the armature shaft 20, includes a commutator plate 31 which is a flat segmented plate roughly triangular in shape, and having three projecting portions 42 and a hole 43 in the center, as shown in FIG. 5. The commutator plate 31, which is mounted on the lower end of the armature shaft 20, and which is spaced relative to a circular plate 44 fixed on the armature shaft roughly at the center of said shaft, is held in a fixed or staked position by downwardly extending legs 49 of the upper armature lamination 46A, which are attached to the three projecting portions 42 of the commutator plate. At the ends of the three projecting portions 42 of the commutator plate 31, notches 45 are provided. The commutator plate is preferably fabricated by a printed circuit method, although any conventional type of material may be used for this purpose.

A pair of armature laminations 46A and 46B, which are preferably of a soft magnetic iron, are fastened on the armature shaft 20 as shown in FIG. 5. The armature laminations are shaped so that there are three semi-circular segments 47 connected at the center by becks 48. At the ends of the semi-circular segments 47 of the upper armature lamination 46A, a downwardly extending leg 49 is provided. Armature windings 50 are wound on the necks 48 of the armature laminations 46A and 46B, each of which windings has terminal connections so that they are individually connected to one of the armature laminations. The windings 50 are of fine coated insulated copper wire and are wound in the conventional manner used for small motors of this type.

The pair of armature laminations 46A and 46B, assembled as described above, are then fixedly mounted on the armature shaft 20 by passing the upper portion of the shaft through holes 51 in the center of the armature laminations. The armature assembly rests firmly upon the circular plate 44 of the armature shaft 20, and is spaced from the commutator plate 31 by said circular plate. The downwardly extending legs 49 extending from the armature laminations are adapted to fit into the notches 45 of the commutator plate 31 to hold the assembly in fixed position.

While on the above assembly a pair of armature laminations has been employed, it has been found that a single armature lamination, made of a single plate of soft metal having magnetic properties, can be used in place of the two armature laminations. It has been found that by the use of two laminations, less distortion is encountered in the assembly.

A cluster gear shaft 52, having a drive pinion gear 53 is mounted vertically for rotation in an opening 54 provided in the floor of the housing. The drive pinion gear 53 which rotates in a horizontal plane is provided with teeth that mesh with the crown gear 27 mounted in the housing.

A gear plate 55, preferably of a shape extending over the motor assembly and housing, which is provided with a circular opening 56 to accommodate the armature shaft 20, and a second circular opening 57 to accommodate the cluster gear shaft 52, is then placed in position to cover the armature assembly. When the gear plate 55 is in position, the armature shaft 20 and the cluster gear shaft 52 extend above the upper surface of the gear plate. An armature pinion gear 58 is then fixedly mounted on the upper end of the armature shaft 20 extending through the gear plate 55, and a driven gear 59 is fixedly mounted on the cluster gear shaft 52 which also extends above the gear plate. An idler gear 60 is then mounted for rotation on an idler bearing pin 61, mounted in the gear plate 55 as shown in FIG. 5. The teeth of the idler gear 60 mesh on one side with the teeth of the armature pinion gear 58 and on the opposite side with the teeth of the driven gear 59, so that the power of the motor causing rotation of the armature gear shaft 20 is transmitted by the armature pinion gear 58 to the idler gear 60 and to the driven gear 59. The consequent rotation of the driven gear 59 turns the cluster gear shaft 52, which in turn rotates the drive pinion gear 53.

When the drive pinion gear 53 rotates, its teeth which mesh with the teeth of the crown gear 27, cause the latter to rotate vertically. Since the crown gear is fixedly mounted on the axle 26, rotation of the crown gear rotates the axle, thus causing the rear wheels 25 to rotate to move the vehicle forward.

A spring clamp 62, preferably of spring metal and having a pair of clamp ends 63 at each end, adapted to fit into slots 64 in the sides of the housing 10, holds the gear plate in position and maintains the idler gear 60 in position.

If it is desired to take apart the motor assembly, the clamp ends 63 are released from the slots 64 in the housing and the spring clamp 62 can then be removed. The idler gear 60 can then be lifted off the idler bearing pin 61 and the gear plate 55 can then be removed from the housing 10.

In the assembly of the armature pinion gear 58, the idler gear 60 and the driven gear 59, the sizes of the gears can be modified to suit conditions as desired to provide for changes in gear ratio. The variation in the size of the gears can be advantageously used to provide for greater speed on one hand or, on the other hand, for greater power. Thus, if it is desired that more power be generated, the armature pinion gear 58 size may be increased in size and the driven gear 59 reduced. Similarly, if more speed and less power is desired, the armature pinion gear will be reduced in size while the driven gear is increased in size.

In order to guide the vehicle on the track a guide plate 65 having a guide pin 66 is mounted on the front of the housing 10, so that the guide pin 66 extends below the plane of the tires. The guide pin 66 is adapted to slide in a slot provided in the track to guide the vehicle along a designated line of travel.

From the above description, it will be seen readily that our new electric motor is especially useful for toy models of automobiles and other vehicles. It is easy to assemble and due to its compact combined housing and chassis for the vehicle, it can be fitted into very small spaces without losing power or torque. Furthermore, the motor can be quickly and easily disassembled for repair, cleaning and replacing parts, and then reassembled without harm to any of the miniature parts.

Since the combined housing and chassis is of unitized construction, space is saved, and there is no need for insulation since the material of the housing provides ample insulation as well as bearing surfaces for moving parts. The housing is of a plastic material which provides bearing surfaces for metal parts without lubrication.

In the assembly of the armature laminations, I prefer to dip them in a conventional insulating paint or plastic coating material of between .001 to .002 inch thickness, to eliminate the need of employing insulating paper to separate the laminations. By this means the resulting reduction of the over all thickness of the laminatories, also reduces the over all thickness of the armature wire windings 50.

Having described our invention, we claim:

1. A toy vehicle having an electric motor comprising in combination, a stationary housing of insulating material, said housing serving as the chassis for the vehicle, a removable cover for said housing, a rotatable armature mounted on an armature shaft, said armature having a plurality of windings, a commutator plate mounted on said armature shaft below the armature, the lower end of said armature shaft being mounted in the floor of said housing and the upper end of said shaft extending through the said removable cover, a plurality of commutator brushes extending through the floor of said housing adapted to bear against the under surface of said commutator plate, spring fingers attached to the housing bearing against the under side of the commutator brushes to cause the commutator brushes to bear against the commutator plate, means connected to the commutator brushes for supplying electrical current thereto, a pair of field magnets mounted in said housing around the armature, said removable cover for the housing having gears mounted thereon, a gear fixed on the upper end of the armature shaft for transmitting the power of said motor through said cover gears to a crown gear fixedly mounted on an axle of the vehicle.

2. A toy vehicle adapted to move on a track having electrical power sources therein comprising in combination, a unitized housing and chassis of insulating material, said housing having a floor and a removable cover, an armature assembly consisting of a flat armature having a plurality of armature windings, said armature being mounted on a vertical armature shaft, a commutator plate mounted on said shaft below the armature and staked thereto, the lower end of said shaft rotatably mounted in the floor of the housing and the upper end thereof extending through said removable cover, a plurality of field magnets mounted in the housing and encircling the armature assembly, a plurality of commutator brushes extending from the floor of the housing and adapted to contact the commutator plate, a plurality of pick-up shoes adapted to contact electrical power sources in a track, said pick-up shoes being connected to the commutator brushes for supplying electrical power thereto, and a gear fixedly mounted on the upper end of the armature shaft.

3. A miniature toy vehicle comprising in combination, a flat fully enclosed hollow wheeled housing of insulating material, said housing serving as a chassis for the miniature vehicle, a rotatable armature shaft disposed within said chassis housing and journaled in the top and floor of said housing, a flat armature mounted on said shaft within said housing, said armature comprising a flat armature plate having a plurality of relatively flat windings to fit within said flat housing, a flat commutator plate mounted on said shaft within said housing, a plurality of commutator brushes mounted in said housing and engaging against said commutator plate, spring fingers secured to the outside of said housing and engaging said brushes to press them against said commutator plate, means connected to the commutator brushes for supplying electrical current thereto, a pair of field magnets mounted in said housing around said armature, and a gear train connecting said armature shaft with a crown gear on an axle of said wheeled housing to propel said vehicle.

4. A miniature toy of the character defined in claim 3 wherein said housing comprises a floor portion and a separate removable cover portion, and wherein there is provided a removable spring clamp extending over said cover portion and having snap engagement with said floor portion for removably holding said cover portion in place.

5. A miniature toy of the character defined in claim 3 wherein said gear train is connected with said cover portion and with the end of the armature shaft in said cover portion and wherein said armature shaft, said armature and said commutator plate, as a unit, is removable with the said cover portion.

6. A miniature toy of the character defined in claim 3 wherein said field magnets are loosely seated in said floor portion of said housing and are removable therefrom.

7. A miniature toy of the character defined in claim 3 wherein said armature plate is coated with an insulating material and said windings comprise fine coated wires to insulate said wire from said armature plate.

8. A miniature toy of the character defined in claim 3 wherein said armature plate is provided with legs connected to said commutator plate to hold said commutator plate in fixed position relative to said armature.

9. A miniature toy of the character defined in claim 3 wherein said housing is provided with pick-up shoes hingedly connected to said spring fingers for transmitting electric current to said commutator brushes.

10. A miniature toy of the character defined in claim 3 wherein said housing is provided with pick-up shoes, said shoes at one end being hingedly connected to said spring fingers for transmitting electric current to said commutator brushes, said shoes at their opposite ends being floatingly engaged between projections on said housing, and spring elements between said shoes and said housing.

11. A miniature toy of the character defined in claim 3 wherein said housing is for use on a track and wherein there is provided on said housing a guide post for guiding engagement in said track.

References Cited by the Examiner
UNITED STATES PATENTS

| | | | |
|---|---|---|---|
| 498,743 | 5/1893 | Connelly | 46—243 X |
| 1,951,505 | 3/1934 | Dambrine | 46—244 |
| 2,703,534 | 3/1955 | Copeland. | |
| 2,832,177 | 4/1958 | Mueller | 46—244 |
| 2,897,770 | 8/1959 | Bonanno | 105—49 |
| 2,903,974 | 9/1959 | Smith | 46—243 X |
| 3,019,555 | 2/1962 | Poticha | 46—243 |
| 3,072,812 | 1/1963 | Gaddes | 310—154 |

DELBERT B. LOWE, *Primary Examiner.*

RICHARD C. PINKHAM, *Examiner.*

ROBERT F. CUTTING, *Assistant Examiner.*